United States Patent [19]

Ikoma et al.

[11] 4,440,387
[45] Apr. 3, 1984

[54] SHEET FEED APPARATUS

[75] Inventors: Tadashi Ikoma; Akira Hirose; Yohtaro Kakitani, all of Tokyo, Japan

[73] Assignee: Ricoh Company, Ltd., Tokyo, Japan

[21] Appl. No.: 401,502

[22] Filed: Jul. 26, 1982

Related U.S. Application Data

[63] Continuation of Ser. No. 891,530, Mar. 30, 1978, abandoned.

[30] Foreign Application Priority Data

Apr. 8, 1977 [JP] Japan .................................. 52-40193

[51] Int. Cl.³ .............................................. B65H 9/04
[52] U.S. Cl. .................................... 271/245; 271/227; 271/273
[58] Field of Search ............... 271/227, 245, 246, 273, 271/274, 277

[56] References Cited

U.S. PATENT DOCUMENTS

| 3,741,357 | 6/1973 | Krysiuk | 271/227 X |
| 3,988,019 | 10/1976 | Achelpohl | 271/274 X |
| 4,020,972 | 5/1977 | Lundblad | 271/245 X |
| 4,023,791 | 5/1977 | Hori | 271/246 X |
| 4,147,339 | 4/1979 | Shiina | 271/245 X |

Primary Examiner—Richard A. Schacher
Attorney, Agent, or Firm—David G. Alexander

[57] ABSTRACT

An endless belt is disposed closely above and parallel to a transparent platen. The belt is rotatably driven to move an original document for electrophotography or the like from an inlet onto the platen into engagement with a stopper. Pressure means cause the belt to initially press against the document with a large force to ensure document transport across the platen. The belt drive means is de-energized and the pressure force reduced just before the document engages the stopper to prevent jamming of the leading edge of the document against the stopper as the belt overtravels the document due to its inertia. After an imaging exposure of the document, the stopper is retracted and the belts driven to discharge the document from the platen into a tray provided at an outlet. Means are provided to discharge static electricity from the document and facilitate document stacking in the tray. A spacer plate limits upward and lateral movement of the belt, thereby preventing rebound and lateral displacement of the document when the document engages the stopper. The document feed means is designed to ensure that one document will be discharged completely before a subsequent document engages the stopper. The inertia of the belt and drive means is selected such that, even though a predetermined error range is unavoidable in the timing of de-energizing the drive means before the document engages the stopper, the drive means will be de-energized before the document engages the stopper and said inertia will be great enough to carry the document to the stopper.

6 Claims, 11 Drawing Figures

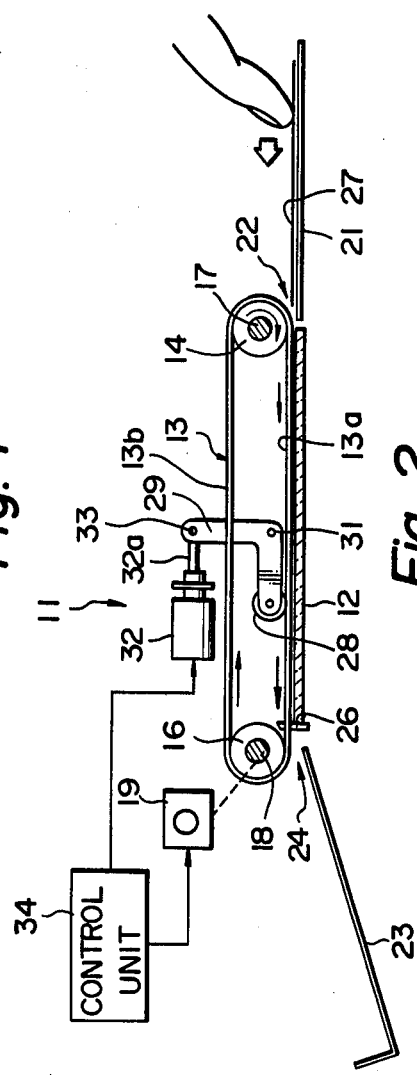
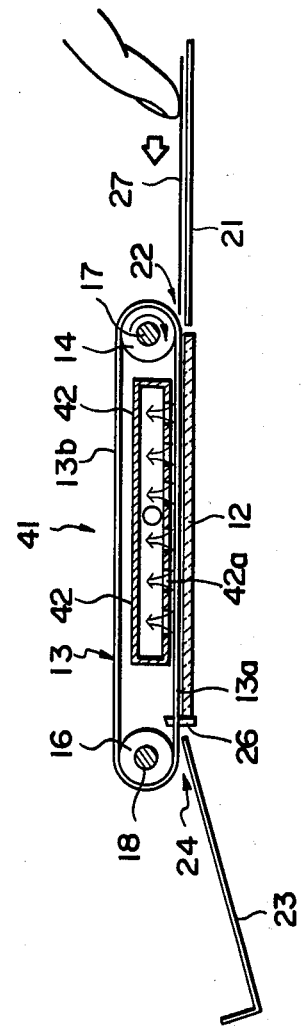

SHEET FEED APPARATUS

CROSS REFERENCE TO RELATED APPLICATION

This application is a continuation of copending U.S. Pat. application Ser. No. 891,530, filed Mar. 30, 1978, and now abandoned.

BACKGROUND OF THE INVENTION

The present invention relates to an improved sheet feed apparatus for feeding, for example, an original document to be electrostatically copied onto a transparent platen and subsequently feeding the document into a discharge tray after an imaging exposure is completed.

A basic sheet feed apparatus of this type is disclosed in U.S. Pat. No. 4,023,791 which comprises a plurality of parallel endless belts disposed closely above a glass platen. A document in sheet form is inserted into an inlet and fed by the belts over the platen into engagement with a stopper, at which time the belts are stopped. After an imaging exposure, the stopper is retracted and the belts driven to feed the document off the platen to a discharge tray provided at an outlet. Rollers are provided at various positions to urge the belts into pressing engagement with the document to enhance the transport thereof across the platen.

This apparatus, although generally effective, suffers from a disadvantage where thin documents, such as letters on international airmail stationery, are to be copied. In order to ensure that the document will be carried to the stopper, the belts are allowed to overtravel due to their inertia for a brief distance after the document engages the stopper. For thick documents which are relatively rigid, no problems are encountered since the belts slidably overtravel the document. However, for thin documents, the combination of the frictional force between the belts and document and the low weight of the document cause the document to continue to move after engagement with the stopper. The result is that the leading edge of the document is jammed against the stopper and in some cases torn. At best, the leading edge of the document is merely wrinkled and the resulting copy is out of register with the image area of the document.

In this prior art apparatus the pressure force of the rollers must be great enough to ensure that the belts will feed a thick, heavy document to the stopper. In other words, the belts must not slide over the document until the document engages the stopper. However, such a high pressure force causes thin documents to jam against the stopper in the manner described. Thus, the prior art apparatus cannot accommodate both thick and thin documents without transport failure. Although a switch means may be provided to selectably vary the pressure force of the rollers in accordance with the type of document, such a switch means is a nuisance for the apparatus operator and may frequently be neglected, with the result of a transport failure and possible damage to a valuable document. Although the prior art apparatus greatly increases the copying speed where a large number of sheet documents are to be copied by eliminating the time required to open and close a presser plate for copying each document, it has not been heretofore perfected.

Another problem is with static electricity induced on the document by sliding movement of the belts thereover. Such static electricity frequently prevents documents from being neatly stacked in the discharge tray.

Where thick documents are copied, it frequently occurs that the documents rebound upon abutment with the stopper. A lateral movement of the document occurs during rebound due to lateral movement of the belts, and the copy is out of register with the document image area in the lateral direction.

Yet another problem occurs in de-energizing the belt drive means at precisely the right time before the document engages the stopper. If the drive means is de-energized after the document engages the stopper, the document will jam against the stopper. If the drive means is de-energized too soon, the belts will not carry the document completely to the stopper.

SUMMARY OF THE INVENTION

In accordance with the present invention, an endless belt is disposed closely above and parallel to a transparent platen. The belt is rotatably driven to move an original document for electrophotography or the like from an inlet onto the platen into engagement with a stopper. Pressure means cause the belt to initially press against the document with a large force to ensure document transport across the platen. The belt drive means is de-energized and the pressure force reduced just before the document engages the stopper to prevent jamming of the leading edge of the document against the stopper as the belt overtravels the document due to its inertia. After an imaging exposure of the document, the stopper is retracted and the belts driven to discharge the document from the platen into a tray provided at an outlet. Means are provided to discharge static electricity from the document and facilitate document stacking in the tray. A spacer plate limits upward and lateral movement of the belt, thereby preventing rebound and lateral displacement of the document when the document engages the stopper. The document feed means is designed to ensure that one document will be discharged completely before a subsequent document engages the stopper. The inertia of the belt and drive means is selected such that, even though a predetermined error range is unavoidable in the timing of de-energizing the drive means before the document engages the stopper, the drive means will be de-energized before the document engages the stopper and said inertia will be great enough to carry the document to the stopper.

It is an object of the present invention to provide a sheet feed apparatus for an electrostatic copying machine or the like which can reliably feed documents of any thickness.

It is another object of the present invention to provide a sheet feed apparatus which eliminates the problem of static electricity and provides reliable and neat stacking of sheet documents fed therethrough.

It is another object of the present invention to provide a sheet feed apparatus which eliminates the problem of rebound and lateral displacement upon engagement of a document with a stopper member.

It is another object of the present invention to provide a sheet feed apparatus which ensures that a document will be completely discharged therefrom before a subsequent document engages a stopper thereof.

It is another object of the present invention to provide a sheet feed apparatus which eliminates the problems caused by sensor error in the timing of deenergizing a belt drive means and further eliminates the necessity for precise timing.

It is another object of the present invention to provide a generally improved sheet feed apparatus for an electrostatic copying machine or the like.

Other objects, together with the foregoing, are attained in the embodiments described in the following description and illustrated in the accompanying drawing.

BRIEF DESCRIPTION OF THE DRAWING

FIG. 1 is a schematic side elevation of a sheet feed apparatus embodying the present invention;

FIG. 2 is similar to FIG. 1 but shows another sheet feed apparatus of the present invention;

DESCRIPTION OF THE PREFERRED EMBODIMENTS

Figure 3:
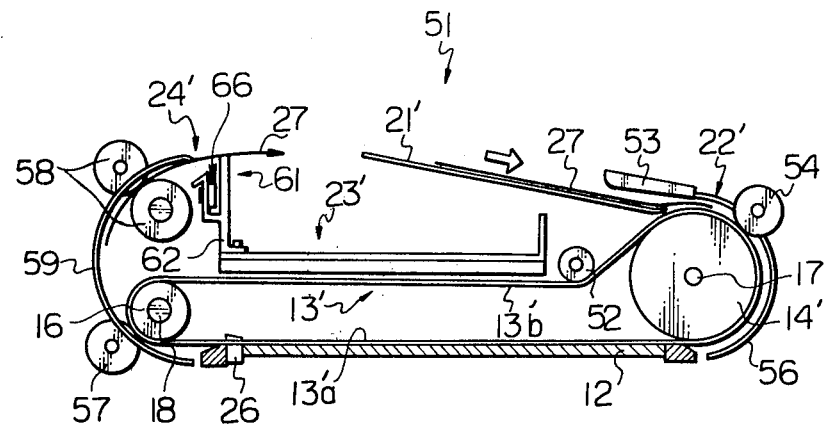
FIG. 3 is a shcematic side elevation of a sheet feed apparatus of the present invention comprising a static electricity discharge means.

While the sheet feed apparatus of the invention is susceptible of numerous physical embodiments, depending upon the environment and requirements of use, substantial numbers of the herein shown and described embodiments have been made, tested and used, and all have performed in an eminently satisfactory manner.

Referring now to FIG. 1 of the drawing, a sheet feed apparatus for an electrostatic copying machine or the like (not shown) is generally designated by the reference numeral 11 and comprises a horizontal transparent document support platen 12. A plurality of endless belts 13 (only one endless belt 13 is visible in the drawing) are trained around pulleys 14 and 16 which are fixed to rotary shafts 17 and 18 respectively. The belts 13 are parallel to the platen 12, each comprising a lower run 13a disposed closely above the platen 12 and an upper run 13b disposed above the lower run 13a. The belts 13 may be rotatably driven in the clockwise direction by means of a drive motor 19 connected to the shaft 18. An inlet guide plate 21 is provided rightward of the right edge (upstream edge) of the platen 12. A discharge tray 23 is provided leftward of the left edge (downstream edge) of the platen 12. An inlet 22 is defined between the right edge of the platen 12 and the lower runs 13a. Similarly, an outlet 24 is defined between the left edge of the platen 12 and the lower runs 13a. A stopper 26 is retractably provided to the downstream edge of the platen 12. Although not shown in detail, the stopper 26 is formed with a plurality of fingers which extend upwardly through the lower runs 13a in an illustrated sheet stopping position of the stopper 26. The stopper 26 may be retracted to a downward position (not illustrated) in which the fingers are disposed below the surface of the platen 12.

In operation, the operator of the apparatus 11 inserts an original document in the form of a sheet 27 along the guide plate 21 into the inlet 22. The sheet 27 is frictionally engaged by the lower runs 13a and carried thereby over the upper surface of the platen 12 into abutting engagement with the stopper 26, which is initially moved to its upper position. The drive motor 19 is de-energized just as the leading edge (left edge) of the sheet 27 abuts against the stopper 26.

Alternatively, the drive motor 19 is de-energized as the leading edge of the sheet 27 closely approaches the stopper 26. In either case, the inertia of the belts 13, pulleys 14 and 16, shafts 17 and 18 and motor 19 cause the lower runs 13a to slidably overtravel the sheet 27 for a short distance after the sheet 27 abuts against and is stopped by the stopper 26.

The apparatus 11 further comprises a pressure roller 28 which is rotatably mounted on the lower end of a bellcrank lever 29. The roller 28 and a pivot shaft 31 of the bellcrank lever 29 are disposed between the lower and upper runs 13a and 13b respectively. An electrical solenoid 32 is fixedly mounted but provided with an axially movable actuator rod 32a which is pivotally connected to the upper end of the bellcrank lever 29 by a pin 33.

As the sheet 27 is inserted into the inlet 22, a control unit 34 which controls the overall operation of the apparatus 11 including the drive motor 19 energizes the solenoid 32 causing the rod 32a to be retracted, or pulled leftwardly into the body of the solenoid 32. This causes the bellcrank lever 29 to rotate counterclockwise and the roller 28 to pressingly engage the lower runs 13a. In other words, the roller 28 presses the lower runs 13a against the platen 12. As the sheet 27 is moved under the roller 28 by the lower runs 13a, the lower runs 13a are pressed against the sheet 27 by the roller 28. The increased pressure force of the lower runs 13a against the sheet 27 insures that the sheet 27 will be fed by the lower runs 13a to the stopper 26 even if the sheet 27 is thick and heavy. The increased frictional force of the lower runs 13a on the sheet 27 positively prevents the lower runs 13a from slipping over the sheet 27 until the sheet 27 is stopped by the stopper 26.

Just as the leading edge of the sheet 27 engages the stopper 26, or as the sheet 27 closely approaches the stopper 26, the control unit 34 de-energizes the solenoid 32 and motor 19. With the force of the solenoid 32 removed, the roller 28 is pressed against the lower runs 13a only by its own weight and the weight of the bellcrank lever 29. In other words, the pressure force of the roller 28 on the lower runs 13a is substantially reduced. Thus, after the leading edge of the sheet 27 engages the stopper 26 and is stopped thereby, the lower runs 13a will continue to move due to inertia and slide over the sheet 27. This further tends to correct any skew of the sheet 27 introduced before or during transport over the platen 12 since the lower runs 13a will align the leading edge of the sheet 27 against the stopper 26. However, in accordance with an important feature of the present invention, due to the reduced pressure force on the sheet 27, the sheet 27 will not jam against the stopper 26 even if the sheet 27 is thin and light.

In summary, it will be seen that the pressure force of the lower runs 13a against the sheet 27 is initially large, ensuring that even a thick and heavy sheet will be transported across the platen 12 upon insertion of the sheet 27 into the inlet 22. As the leading edge of the sheet 27 closely approaches the stopper 26, the pressure force is substantially reduced to ensure that the leading edge of even a thin and light sheet will not be bunched or jammed against the stopper 26 due to overtravel of the belts 13. Thus, a sheet document 27 of any thickness and weight will be reliably transported by the belts 13 onto the platen 12 into aligning engagement with the stopper 26.

After the drive motor 19 and solenoid 32 are de-energized, an exposure optical system (not shown) scans the document 27 and focusses a light image thereof onto a photoconductive drum to form an electrostatic image of the document 27. A toner substance is applied to the drum to develop the electrostatic image into a toner image which is transferred and fixed to a copy sheet to provide a permanent reproduction or copy of the document 27.

After the imaging exposure, the stopper 26 is retracted and the belts 13 again driven to discharge the sheet 27 onto the tray 23. If desired, the solenoid 32 may be energized to increase the sheet transport force. After the trailing edge of the sheet 27 clears the stopper 26, the stopper 26 is raised and another sheet may be inserted into the inlet 22 for copying.

FIG. 2 illustrates another embodiment of the present invention in the form of an apparatus 41. Like elements are designated by the same reference numerals. In the apparatus 41, the roller 28 and bellcrank lever 29 are omitted and a suction box 42 mounted between the lower and upper runs 13a and 13b, with the lower surface of the suction box 42 being closely above the lower runs 13a. The lower surface of the suction box 42 is formed with a plurality of apertures 42a, only one aperture 42a being labeled to prevent cluttering of the drawing. Although not shown, means are provided to suck air from the box 42 to a variable extent.

As the sheet 27 is inserted into the inlet 22, a large suction force is applied to the box 42. As the sheet 27 reaches the box 42, the suction force at the apertures 42a causes the sheet 27 to be strongly sucked upwardly into pressing engagement with the lower runs 13a. This high pressure force between the lower runs 13a and the sheet 27 ensures positive transport of the sheet 27 across the platen 12.

As the sheet 27 closely approaches the stopper 26, the suction force to the box 42 is removed or reduced. Thus, the pressure force between the lower runs 13a and the sheet 27 is reduced and the leading edge of the sheet 27 is prevented from jamming against the stopper 26 in the manner described above.

FIG. 3 shows a modified apparatus 51 of the present invention in which like elements are designated by the same reference numerals and corresponding but not identical elements are designated by the same reference numerals primed. Although not shown in the drawing, either the roller 28 or the suction box 42 may be provided to the apparatus 51.

In the apparatus 51, pulleys 14' are larger than the pulleys 14 and furthermore a tension roller 52 is provided to apply tension to belts 13' having lower and upper runs 13a' and 13b' respectively. The sheet 27 is inserted into an inlet 22' defined between lower and upper guide plates 21' and 53 respectively. The sheet 27 enters the bite of a pinch roller 54 which presses the sheet 27 against the peripheries of the belts 13' to feed the sheet 27 around the pulleys 14'. A curved guide plate 56 guides the sheet 27 onto the right edge portion of the platen 12.

After the imaging exposure, the sheet 27 is fed from the platen 12 into the bite of a pinch roller 57 which presses the sheet 27 against the peripheries of the belts 13' to feed the sheet 27 into the bite of outlet feed rollers 58. A curved guide plate 59 guides the sheet 27 from the pinch roller 57 to the feed rollers 58. The feed rollers 58 discharge the sheet 27 into a discharge tray 23' provided above the belts 13'. Subsequent sheets are automatically stacked in the tray 23'.

Figure 4:
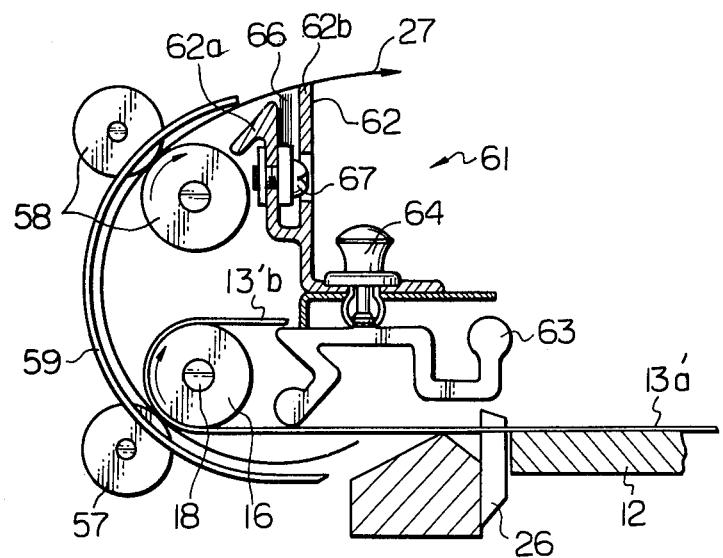
FIG. 4 is a fragmentary view of portion of the apparatus of FIG. 3, to an enlarged scale.

As described hereinabove, it is desirable for the belts 13' to slightly overtravel the sheet 27 after the sheet 27 engages the stopper 26. This ensures positive engagement of the sheet 27 against the stopper 26 and corrects for any skew of the sheet 27 introduced before or during transport. However, the sliding of the belts 13' over the sheet 27 causes static electricity to be induced on the upper surface of the sheet 27. This static electricity causes the sheet 27 to curl and cling to the various walls of the tray 23', resulting in a failure of the sheets to stack neatly in the tray 23'. To overcome this problem, the present invention provides static electricity discharge means 61 which is illustrated in enlarged scale in FIG. 4.

The discharge means comprises an upstanding bifurcated plate 62 which is detachably fastened to a frame 63 of the apparatus 51 by means of a thumb screw 64 or the like. The plate 62 constitutes a left wall of the tray 23'. A static electricity discharge member in the form of an electrically conductive metal brush 66 is fastened to the plate 62 between the bifurcations by a screw 67. All of the elements of the discharge means 61 in addition to the frame 63 are made of electrically conductive materials. Preferably, the frame 63 is electrically grounded. The left bifurcation of the plate 62 is formed into a slanted guide edge 62a which guides the sheet 27 closely over the brush 66. The right bifurcation of the plate 62 is designated as 62b and picks up the sheet 27 from the guide edge 62a to guide the sheet 27 into the tray 23'. It will be noted that the surface of the sheet 27 which passes over the brush 66 is the same surface which contacts the belts 13'.

As the sheet 27 moves above the brush 66, any static electricity induced on the sheet 27 by the belts 13' is dissipated by the brush 66. The gap between the sheet 27 and brush 66 is made small so that static electric discharge may occur between the sheet 27 and the grounded brush 66.

The guide edge 62a prevents the leading edge of the sheet 27 from abutting against the brush 66. Although no problem would occur with a thick sheet 27, the leading edge of a thin sheet 27 may jam against the brush 66. However, in certain applications, it may be desirable to modify the discharge means 61 in such a manner that the sheet 27 directly contacts the brush 66.

In order that any sheet jam occuring between the rollers 57 and 58 may be cleared easily and quickly, the plate 62 is made detachable from the frame 63 by means of the thumb screw 64. However, it is also desirable to be able to view the area of the guid plate 59 without taking the time and trouble of removing the plate 62 to determine if a sheet jam has actually occured in this area. For this reason, the plate 62 may be formed of a transparent material such as plastic. Since such a material is not electrically conductive, a wire (not shown) may be provided to electrically connect the brush 66 to the frame 63.

Figure 5:
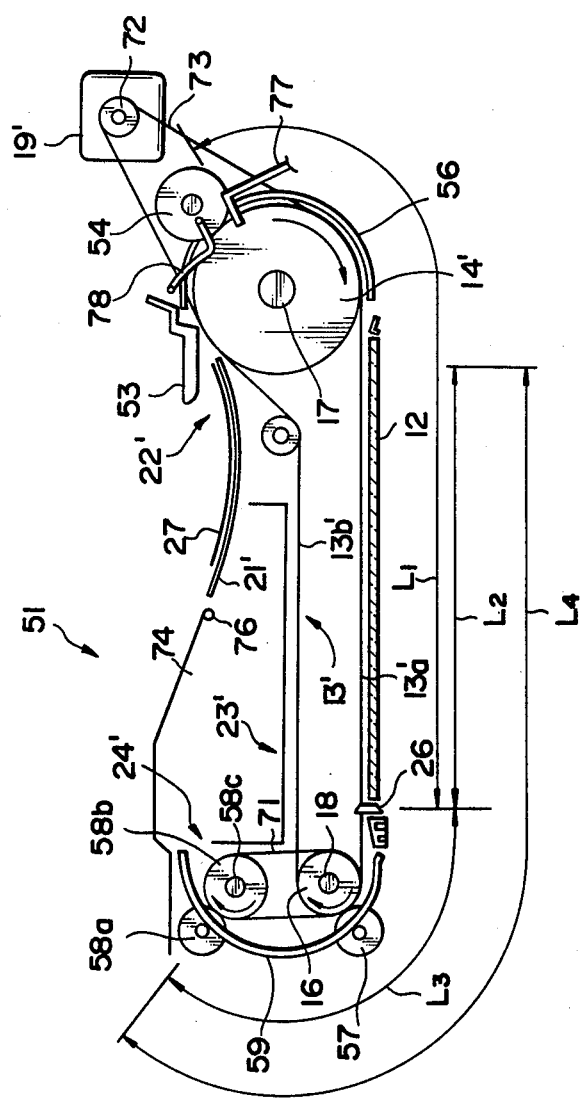
FIG. 5 is a shcematic view of the apparatus of FIG. 3 illustrating a sheet feed path thereof.

FIG. 5 illustrates how the apparatus 51 is advantageously constructed so as to employ a unitary drive means for the belts 13' and feed rollers 58. In FIG. 5, the feed rollers are individually designated as 58a and 58b and are driven in interlocked relation with the belts 13'. More specifically, the shaft 18 is connected to a rotary shaft 58c on which the feed roller 58b is fixed by means of a belt 71 trained around pulleys (not visible) fixed to the shafts 18 and 58c respectively. A drive motor 19' drives the shaft 17 by means of a capstan 72, a belt 73 which is trained around the capstan 72 and a pulley (not visible) fixed to the shaft 17. Further illustrated is a cover 74 which can be swung upward about a hinge 76 to allow documents to be removed from the tray 23'.

Although not illustrated, the pinch roller 54 is movable into and out of engagement with the belts 13'. A stopper 77 formed with fingers (not illustrated) similar to the stopper 26 is movable into a sheet stopping position as shown with the fingers intruding between the belts 13'. Further illustrated is a microswitch actuator 78 disposed in the vicinity of the roller 54.

For copying, the document 27 is inserted between the guide plates 21' and 53 until the leading edge of the document 27 is abuttingly stopped by the stopper 77. The actuator 78 is displaced by the document 27 to close a microswitch (not shown), indicating that the document 27 is in a standby position in engagement with the stopper 77. Then, a print switch (not shown) is depressed.

Prior to depression of the print switch, the roller 54 is moved away from the belts 13'. However, upon depression of the print switch the roller 54 is moved into feeding engagement with the document 27 and belts 13', the motor 19' is energized and the stopper 77 is retracted. This causes the document 27 to be fed by the belts 13' and pinch roller 54 onto the platen 12 into engagement with the stopper 26, at which time the motor 19' is de-energized. After the belts 13' have been driven for a sufficient length of time for the trailing edge of the document 27 to clear the stopper 77, the stopper 77 is moved back to the sheet stopping position and the pinch roller 54 is moved away from the belts 13'. Another document may then be inserted between the guide plates 21' and 53 to abut against the stopper 77 in preparation for copying.

After the imaging exposure of the document 27 on the platen 12, the motor 19' is energized to drive the belts 13' and feed roller 58b and feed the document 27 off the platen 12 into the discharge tray 23'. If another document has not been inserted into the standby position, the microswitch will remain open and the motor 19' will be de-energized after the document 27 is fed into the discharge tray 23'. However, if another document is present in the standby position, the microswitch will be closed by the actuator 78. Thus, as soon as the motor 19' is energized to feed the first document 27 off the platen 12, the pinch roller 54 is moved into engagement with the new document and the stopper 77 retracted so that the new document is fed onto the platen 12 as the first document 27 is being discharged.

Measured along the feed or transport path of the document 27, in order for the apparatus 51 to operate properly, a distance L1 measured from the stopper 77 to the stopper 26 must be equal to or greater than a distance L4. The distance L4 is equal to a distance L3 measured from the stopper 26 to the feed roller 58b plus a distance L2 which is the length of the longest document 27 which the apparatus 51 can accommodate. This relationship ensures that the document 27 will be completely discharged by the feed rollers 58a and 58b before another document engages the stopper 26.

If the distance L1 were less than the distance L4, one of two possible transport failures would occur. If the motor 19' is energized only long enough for the new document to reach the stopper 26, the first document 27 would not be completely discharged by the feed rollers 58a and 58b. On the other hand, if the motor 19' is energized long enough to completely discharge the first document 27 into the tray 23', the new document will jam against the stopper 26 since the belts 13' will continue to move at full speed after engagement of the new document with the stopper 26 for a distance equal to L4−L1. These two types of transport failure are completely prevented by designing the apparatus 51 such that L1 is greater than or equal to L4.

Figure 6:
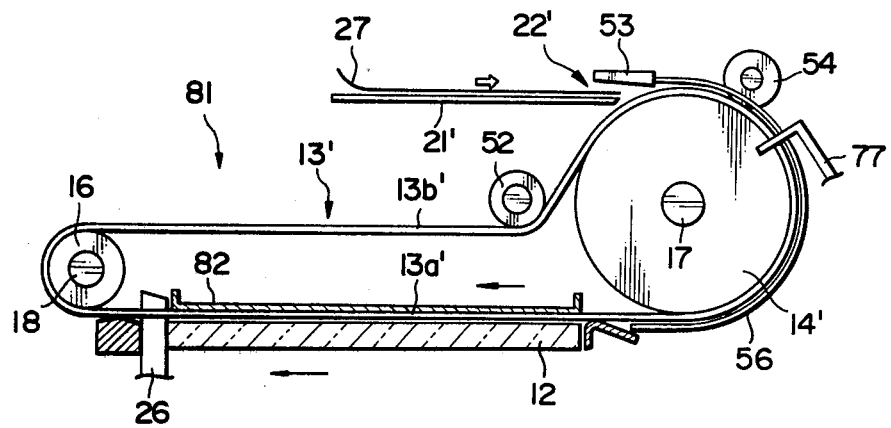
FIG. 6 is a partial view of the apparatus of FIG. 3 illustrating a belt spacer means.
Figure 7:
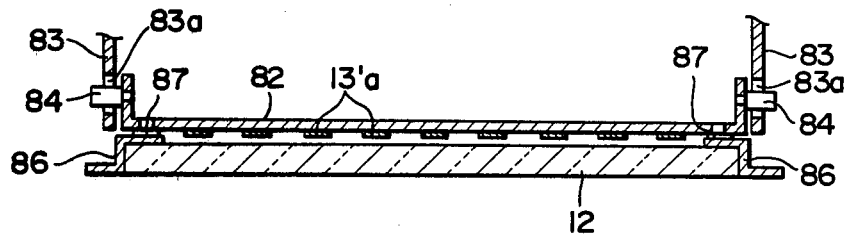
FIGS. 7 and 8 are enlarged sectional views illustrating modified forms of the spacer means.

In the prior art apparatus mentioned hereinabove, a document tends to rebound upon abutment with a stopper provided to a platen and be displaced transversely. This is because the belts are not restrained to the point at which lateral movement thereof is prevented. This problem is completely overcome by the present invention as embodied by an apparatus 81 shown in FIGS. 6 and 7.

The apparatus 81 comprises a spacer plate 82 which is disposed above the lower runs 13a'. As best viewed in FIG. 7, the side edges of the plate 82 are bent upwardly parallel to side wall members 83 of the apparatus 81. Pins 84 extending from the four corners of the plate 82 fit into vertical slots 83a formed through the side wall members 83. In this manner, the plate 82 is movable in the vertical direction but prevented from moving in the longitudinal and transverse directions.

The platen 12 is mounted to the apparatus 81 by means of mounting brackets 86 which fit over the edges of the platen 12. Spacers 87 are secured to the bottom of the plate 82. The plate 82 is urged downwardly by gravity so that the spacers 87 engage the brackets 86. The brackets 86 which serve as spacers and the spacers 87 position the plate 82 above the platen 12 by a predetermined distance. Preferably, a spacing of between 0.5 and 1 mm is defined between the lower runs 13a' and the plate 82 with the lower runs 13a' held against the platen 12.

Figure 8:
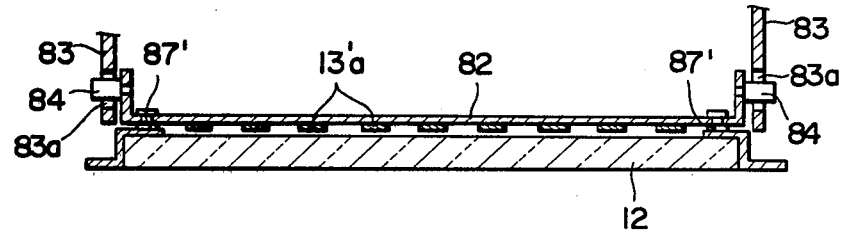
Figure 9:
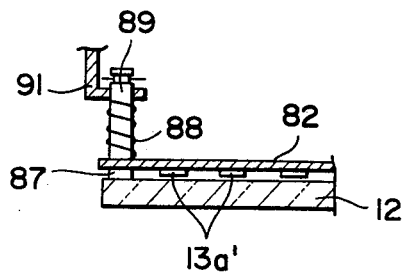
FIG. 9 is a yet further enlarged fragmentary view of another modified form of the spacer means.
Figure 10:
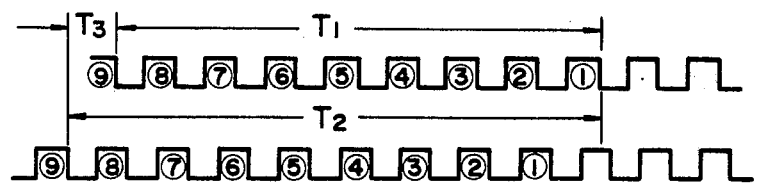
FIGS. 10 and 11 are electrical waveform diagrams illustrating the belt drive means timing.
Figure 11:
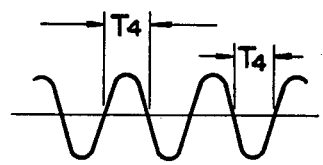

This small gap prevents the lower runs 13a' from being displaced laterally even if a document rebounds from the stopper 26, and thereby prevents misregistration of the image of the document 27 on the finished copy. Furthermore, the plate 82 prevents significant upward movement of the lower runs 13a' and minimizes rebound of the document 27 from the stopper 26. If desired, the plate 82 may be constituted by a lower surface of the suction box 42 shown in FIG. 2.

Where it is desired to press the plate 82 against the brackets 86 with greater force, the spacers 87 may be made magnetic as indicated at 87' in FIG. 8. As another alternative, compression springs 88 may be provided between side walls 91 and a plate 82' to urge the plate 82' downwardly into engagement with the platen 12. Rods 89 upstanding from the four corners of the plate 82' serve as guides for the springs 88.

Where an apparatus of the present invention is operated on A. C. line current, it is convenient to time the duration of energization of the drive motor for feeding a document from the inlet over the platen to the stopper by counting the power supply alternations. In other words, a certain number of alternations occur in the length of time required to feed the document from the inlet to the stopper. The drive motor may be energized and the alternations counter until the predetermined number of alternations have occured, after which time the drive motor is de-energized. The A. C. alternations themselves may be sensed and counted as illustrated in FIG. 11. Alternatively, the A. C. sine wave signal may be half or full wave rectified and squared to produce pulses as shown in FIG. 10. Integrated circuit counters which are readily available at low cost advantageously perform the counting function. The voltage supply to the drive motor may be easily turned on and off by means of thyristor such as a triac controlled by the output of the counter.

Where pulses are counted as in FIG. 10, the counter is typically incremented by the rising edge of each pulse. In the simplified example of FIG. 10, the drive motor is de-energized by the rising edge of the ninth pulse. However, where the drive motor and counter are energized at the same time, the rising edge of the first pulse may not occur for some time after the motor is energized. In the upper portion of FIG. 10 the first rising edge of a pulse occurs in simultaneity with energization of the motor so that the belts 13 are driven for a length of time equal to eight pulse repetition periods. However, in the lower portion of FIG. 10 the motor is energized just after the rising edge of a pulse, so that the counter is not incremented by this pulse. The counter is incremented for the first time by the rising edge of the next pulse. Thus, the motor is energized for almost nine pulse repetition periods. In the upper portion of FIG. 1, the motor is energized for a time T1 which is equal to eight pulse repetition periods. In the lower portion of FIG. 10 the motor is energized for a time T2 which is equal to substantially nine pulse repetition periods. Thus, the maximum error in the length of time the motor is energized is equal to $T3 = T2 - T1$, or one pulse repetition period.

A similar error occurs where the zero crossings of the A. C. sine wave are detected by means of a triac or the like and counted, as shown in FIG. 11. Here, the maximum error, T4, is substantially one alternation of the sine wave or one-half the sine wave period. For 50 Hz A. C. power, the maximum error T4 is substantially 1/100 sec. For 60 Hz A. C. power, the maximum error T4 is substantially 1/120 sec. Assuming 50 Hz power and a sheet transport speed of 1000 mm/sec., the error range is 10 mm.

If the energization time for the drive motor is too short, the document may not be transported long enough to reach the stopper. If the energization time it too long, the document may jam against the stopper. Neither of these alternatives is desirable.

This problem is overcome in accordance with the present invention by optimally selecting the inertia of the drive motor, belts and other members of the drive means in such a manner that within the error range of the drive motor timing, the drive motor is de-energized before the sheet engages the stopper means and said inertia is sufficient to move the sheet into engagement with the stopper means after the drive means is de-energized.

In summary, it will be seen that the present invention overcomes the problems of the prior art and provides a sheet feed apparatus which operates with greatly improved reliability. Various modifications will become possible for those skilled in the art after receiving the teachings of the present disclosure without departing from the scope thereof.

What is claimed is:

1. A sheet feed apparatus comprising:
   a transparent document support platen;
   endless belt means disposed closely above and parallel to the platen;
   drive means for rotatably driving the belt means, the platen and belt means defining an inlet and an outlet in such a manner that a sheet inserted into the inlet is fed by the belt means across the platen toward the outlet upon rotation of the belt means by the drive means;
   sheet stopper means retractably provided to a downstream edge portion of the platen;
   pressure means separate from the belt means for pressing the belt means and sheet together at a predetermined intermediate position; and
   control means for controlling the pressure means to press the belt means and sheet together at said predetermined position with a high force upon insertion of the sheet into the inlet and with a low force as the sheet closely approaches the stopper means.

2. An apparatus as in claim 1, in which the belt means has run disposed above the lower run, the pressure means comprising a pressure member disposed between the upper and lower runs, the pressure member being movable into pressing engagement with the lower run by the control means.

3. An apparatus as in claim 2, in which the pressure member comprises a roller.

4. An apparatus as in claim 1, in which the control means is further operative to control the stopper means and the drive means in such a manner that the stopper means is initially moved to a sheet stopping position and the sheet fed from the inlet into stopping engagement with the stopper means by the belt means, the belt means being subsequently stopped for a predetermined length of time, the stopper means being subsequently retracted from the sheet stopping position and the belt means being driven to discharge the sheet from the outlet.

5. An apparatus as in claim 1, further comprising inlet drive means provided to the inlet and outlet drive means provided to the outlet, the inlet and outlet drive means being driven in interlocked relation, the apparatus defining a sheet feed path from the inlet to the outlet, a first distance measured along the sheet feed path being greater than a second distance measured along the sheet feed path, the first distance being from the inlet to the stopper means, the second distance being equal to a distance from the stopper means to the outlet plus a length of the sheet along the sheet feed path.

6. A sheet feed apparatus comprising:
   a transparent document support platen;
   endless belt means disposed closely above and parallel to the platen;
   drive means for rotatably driving the belt means, the platen and belt means defining an inlet and an outlet in such a manner that a sheet inserted into the inlet is fed by the belt means across the platen toward the outlet upon rotation of the belt means by the drive means;
   sheet stopper means retractably provided to a downstream edge portion of the platen;
   pressure means separate from the belt means for pressing the belt means and sheet together at a predetermined intermediate position;
   control means for controlling the pressure means to press the belt means and sheet together at said predetermined position with a high force upon insertion of the sheet into the inlet and with a low force as the sheet closely approaches the stopper means; and sensor means for producing a signal when the sheet reaches a position closely adjacent to the stopper means, the control means de-energizing the drive means in response to the signal, the sensor means having a predetermined error range, an inertia of the drive means and belt means being selected in such a manner that, within the error range of the sensor means, the drive means is de-energized before the sheet engages the stopper means and said inertia is sufficient to move the sheet into the engagement with the stopper means after the drive means is de-energized.

* * * * *